(12) United States Patent
Nee et al.

(10) Patent No.: US 7,720,177 B2
(45) Date of Patent: May 18, 2010

(54) SYSTEM AND METHOD FOR DETECTING KNOWN SEQUENCE IN TRANSMITTED SEQUENCE

(75) Inventors: Chi-Ping Nee, Santee, CA (US); Durgaprasad Kashinath Shamain, San Diego, CA (US); Gdaliahou Kalit, Nahariya (IL); Abraham Krieger, San Diego, CA (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1282 days.

(21) Appl. No.: 11/194,107

(22) Filed: Jul. 28, 2005

(65) Prior Publication Data

US 2007/0025470 A1  Feb. 1, 2007

(51) Int. Cl.
*H03K 9/00* (2006.01)
*H04L 27/00* (2006.01)

(52) U.S. Cl. ............... 375/316; 375/355; 375/364; 375/365; 375/238; 375/239; 375/242; 375/256; 375/257; 375/286; 375/353; 329/311; 329/300; 329/304; 455/130

(58) Field of Classification Search ............ 375/316, 375/354, 355, 362, 364, 368; 327/141, 162, 327/163; 358/409; 370/503, 509, 512, 513, 370/514; 713/400, 401; 714/12
See application file for complete search history.

(56) References Cited

U.S. PATENT DOCUMENTS

| 5,017,883 | A | * | 5/1991 | Divsalar et al. ............ 329/304 |
| 5,155,742 | A | * | 10/1992 | Ariyavisitakul et al. ..... 375/231 |
| 5,222,101 | A | * | 6/1993 | Ariyavisitakul et al. ..... 375/231 |
| 5,363,414 | A | * | 11/1994 | Muto ........................ 375/340 |
| 5,745,535 | A | * | 4/1998 | Mori ......................... 375/355 |
| 6,628,737 | B1 | * | 9/2003 | Timus ....................... 375/368 |
| 6,658,075 | B1 | * | 12/2003 | Aftelak ...................... 375/375 |
| 7,315,566 | B2 | * | 1/2008 | Tanno et al. ................ 375/142 |
| 2002/0041637 | A1 | * | 4/2002 | Smart et al. ................ 375/316 |
| 2003/0081704 | A1 | * | 5/2003 | Kim .......................... 375/343 |
| 2003/0152178 | A1 | * | 8/2003 | Tanno et al. ................ 375/354 |
| 2004/0013209 | A1 | * | 1/2004 | Zehavi et al. ............... 375/334 |
| 2005/0117665 | A1 | * | 6/2005 | Becker et al. ............... 375/316 |

FOREIGN PATENT DOCUMENTS

JP    07154383 A  *  6/1995

* cited by examiner

*Primary Examiner*—Shuwang Liu
*Assistant Examiner*—Gina McKie
(74) *Attorney, Agent, or Firm*—DLA Piper LLP (US)

(57) ABSTRACT

A known sequence of symbols is located within a transmitted sequence of symbols by estimating the phase differences between offset symbols within a portion or more of the transmitted sequence, estimating the phase differences between offset symbols in the known sequence, and determining that the symbols within the portion or more of the transmitted sequence are the known sequence if the phase difference estimates determined from the symbols within the portion or more of the transmitted sequence are substantially equal to the phase difference estimates determined from the known sequence.

19 Claims, 5 Drawing Sheets

SYSTEM AND METHOD FOR DETECTING KNOWN SEQUENCE IN TRANSMITTED SEQUENCE

BACKGROUND OF THE INVENTION

1. Field of the Invention

This application relates generally to the fields of frame synchronization, carrier acquisition and tracking, and locating known symbol sequences within transmitted sequences, and, more specifically, to methods of detecting known symbol sequences in transmitted sequences through differential signal processing.

2. Related Art

In applications where data is transmitted to receivers in the form of discrete groupings of symbols, such as frames, packets or the like, there is a need to identify the frame or packet boundaries so that the data can be recovered and understood. The process of identifying the frame or packet boundaries may be referred to as frame synchronization.

Frame synchronization is typically achieved through cooperative action between the transmitter and receiver. At the transmitter, a known sequence of symbols is embedded within each frame of data symbols at a known offset from the frame boundary. Upon receipt of the transmitted signal, the conventional receiver locates the known sequence through coherent detection. Since the known sequence is located at a known offset from the frame boundary, this procedure also locates the frame boundary.

A problem arises because, with coherent detection, frame synchronization is delayed by the often substantial time it takes for the receiver to determine the correct orientation of the constellation of possible symbols as mapped onto the complex two-dimensional I-Q plane.

Moreover, as an accumulator must be maintained for each of the possible symbol values and their spectral inversion for the purpose of correlating the known sequence with the received sequence for each of the possible orientations of the symbol constellation, coherent detection can be costly. Thus, for a QPSK symbol constellation, eight accumulators must be maintained, one for each of the four possible QPSK symbols, and another for the spectral inversion of each of the four possible QPSK symbols.

Even in applications involving continuous streams of data, knowledge of the positions of known symbols in a data flow can assist if not enable carrier acquisition and tracking, particularly at low SNRs. However, the use of error control codes (ECC) and the like cannot generally assist in carrier acquisition and tracking at low SNRs.

SUMMARY

The invention provides a method, performed within or by a receiver, of locating a known sequence within a transmitted sequence of symbols, which may be continuous or in discrete groupings.

In this method, one or more first values are formed from symbols within a portion or more of the transmitted sequence, each representing an estimated difference in phase between first and second symbols that are offset from one another.

One or more second values, formed from symbols from the known sequence, each representing an estimated difference in phase between first and second symbols within the known sequence that are likewise offset from one another, are also provided.

The estimated differences in phase represented by the first values are then compared with corresponding ones of the estimated differences in phase represented by the second values. If the one or more estimated differences in phase represented by the one or more first values are substantially equal to corresponding ones of the one or more estimated differences in phase represented by the one or more second values, the symbols within the portion or more of the transmitted sequence are determined to be or include the known sequence.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1A:
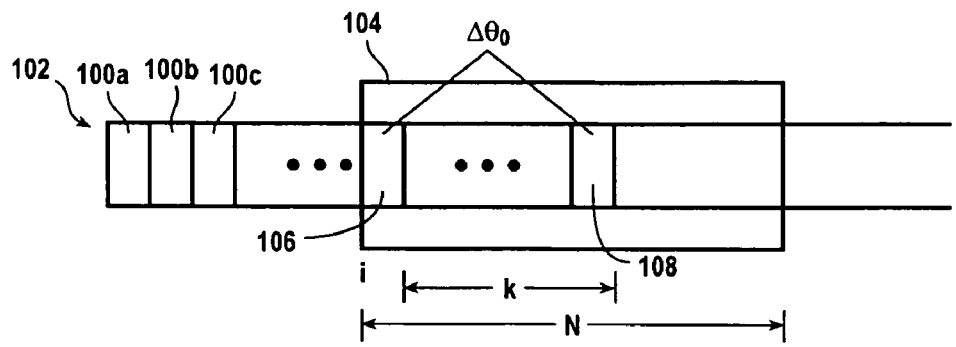
FIG. 1A-1C illustrate the process of successively estimating phase differences between offsetting symbols within the sliding window.

Referring to FIG. 1A, in one embodiment of the invention, a transmitted sequence of symbols 100a, 100b, 100c is received by a receiver and then either processed by a filter (not shown) in real time or stored in buffer 102 and then processed by a filter. Each of the symbols in the transmitted sequence is complex, having an in-phase (I) and quadrature (Q) component. A sliding window 104 having a length of N symbols, N being an integer of two or more, is relatively positioned within the sequence at a position i, such that the sliding window 104 encompasses at least a portion of the transmitted sequence.

Then, a total of N−k first values are successively formed from the N symbols within the sliding window, where k is an integer of one or more that is less than N. Each of these first values $X_n$, $0 \leq n \leq N-k-1$, is computed as $x_n \cdot x_{n+k}^*$, where $x_n$ is the nth symbol within the sliding window, and $x_{n+k}^*$ is the complex conjugate of the (n+k)th symbol within the sliding window. As both $X_n$ and $x_{n+k}$ can be expressed in the form of $|A|e^{j\theta}$, where $|A|=\sqrt{I^2+Q^2}$ and $$\theta = \tan^{-1}\left(\frac{Q}{I}\right),$$

I being the in-phase component of the symbol, and Q being the quadrature component, it can be seen that $x_n \cdot x_{n+k}$ represents the phase difference $\Delta\theta_n = \theta_n - \theta_{n+k}$ between the two symbols $x_n$ and $x_{n+k}$ inasmuch as $x_n = |A_n|e^{j\theta n}$, $x_{n+k}^* = |A_{n+k}|e^{-j\theta n+k}$, and $x_n \cdot x_{n+k}^* = |A_n| \cdot |A_{n+k}|e^{j(\theta n - \theta n+k)}$ or $|A_n| \cdot |A_{n+k}|e^{j\Delta\theta n}$.

Figure 1B:
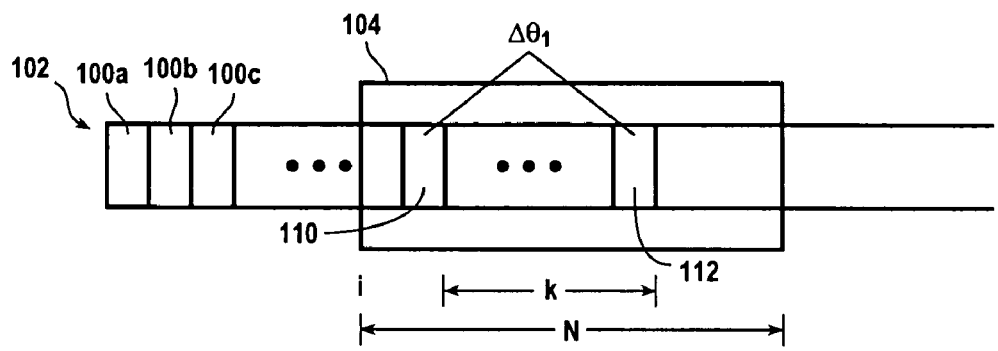
Figure 1C:
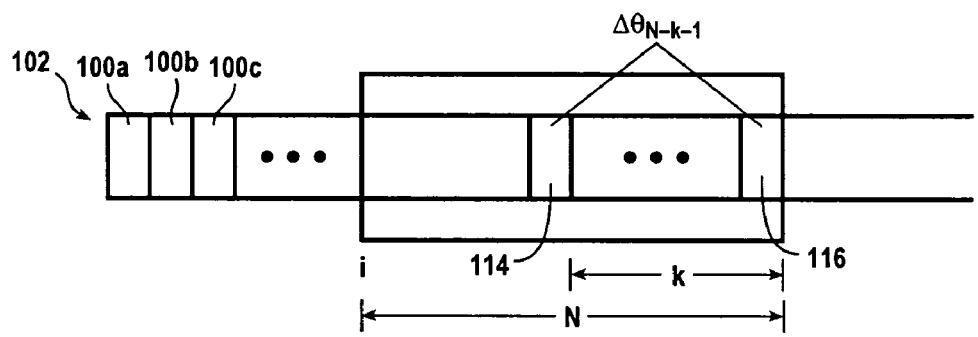

In this embodiment, these first values are successively formed in the following order: $X_0, X_1, \ldots, X_{N-k-1}$. FIG. 1A illustrates the computation of $X_0$ from the symbols $x_0$ and $X_k$ within the sliding window, identified respectively with numerals 106 and 108, that is representative of the phase difference $\Delta\theta_0$ between these symbols. FIG. 1B illustrates the computation of $X_1$ from the symbols $x_1$ and $x_{k+1}$ within the sliding window, identified respectively with numerals 110 and 112, that is representative of the phase difference $\Delta\theta_1$ between these symbols. Finally, FIG. 1C illustrates the computation of $X_{N-k-1}$ from the symbols $x_{N-1}$ and $x_{N-1+k}$ within the sliding window, identified respectively with numerals 114 and 116, that is representative of the phase difference $\Delta\theta_{N-1}$ between these symbols.

Figure 2A:
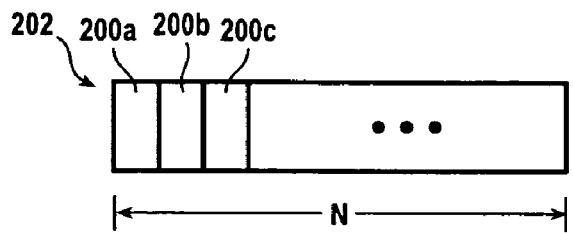
FIG. 2A illustrates a buffer holding the known sequence.

Referring to FIG. 2A, the known sequence of symbols 200a, 200b, 200c may be stored in 202. Each of the symbols in the known sequence is complex, having in-phase (I) and quadrature (Q) components. Then, a total of N-k second values are successively formed from the N symbols within the known sequence. Each of these second values $Y_n$, $0 \leq n \leq N-k-1$, is computed as $s_n \cdot s_{n+k}^*$, where $s_n$ is the nth symbol within the known sequence, and $s_{n+k}^*$ is the complex conjugate of the (n+k)th symbol within the known sequence. As both $s_n$ and $s_{n+k}$ can be expressed in the form of $|B|e^{j\phi}$ where $|B|=\sqrt{I^2+Q^2}$ and $$\varphi = \tan^{-1}\left(\frac{Q}{I}\right),$$

I being the in-phase component of the symbol, and Q being the quadrature component, it can be seen that $S_n \cdot s_{n+k}$ represents the phase difference $\Delta\phi_n = \phi_n - \phi_{n+k}$ between the two symbols $s_n$ and $s_{n+k}$ inasmuch as $s_n = |B_n|e^{j\phi n}$, $s_{n+k}^* = |B_{n+k}|e^{-j\phi n+k}$, and $s_n \cdot s_{n+k}^* = |B_n| \cdot |B_{n+k}|e^{j(\phi n - \phi n+k)}$ or $|B_n| \cdot |B_{n+k}|e^{j\Delta\phi n}$.

Figure 2B:
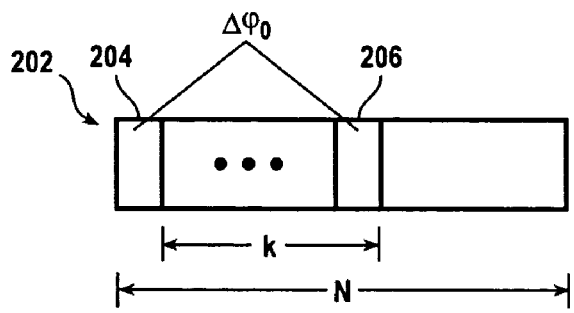
FIGS. 2B-2D illustrate the process of successively estimating phase differences between offsetting symbols within the known sequence.
Figure 2C:
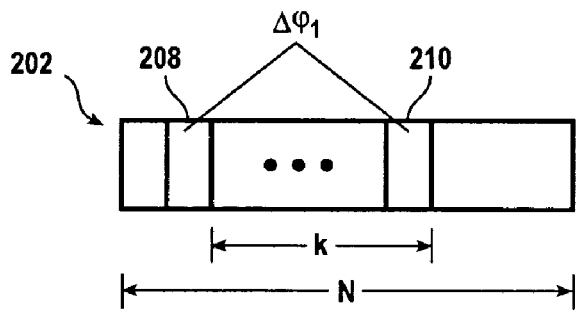
Figure 2D:
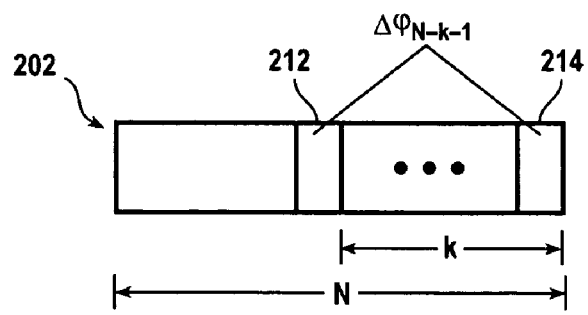

In this embodiment, these second values are successively formed in the following order: $Y_0, Y_1, \ldots, Y_{N-k-1}$. FIG. 2B illustrates the computation of $Y_0$ from the symbols $s_0$ and $s_k$ within the known sequence, identified respectively with numerals 204 and 206, that is representative of the phase difference $\Delta\phi_0$ between these symbols. FIG. 2C illustrates the computation of $Y_1$ from the symbols $s_1$ and $s_{k+1}$ within the known sequence, identified respectively with numerals 208 and 210, that is representative of the phase difference $\Delta\phi_1$ between these symbols. Finally, FIG. 2D illustrates the computation of $Y_{N-k-1}$ from the symbols $s_{N-k-1}$ and $s_{N-1}$ within the known sequence, identified respectively with numerals 212 and 214, that is representative of the phase difference $\Delta\phi_{N-1}$ between these symbols. These second values $Y_0, Y_1, \ldots, Y_{N-k-1}$ have a correspondence with the first values $X_0, X_1, \ldots, X_{N-k-1}$, with the correspondence indicated by the index. Thus, $Y_0$ corresponds with $X_0$, $Y_1$ corresponds with $X_1$, and so on.

A statistic $Z_i$, where the index is the relative position i of the sliding window within the transmitted sequence, is then formed from the first and second values. In one example, the statistic, $Z_i$, representing the aggregate difference between the phase differentials represented by the first and second values at a particular stage of the computation, is computed and set equal to:

$$\sum_{n=0}^{N-k-1} \operatorname{Re}(X_n) \times \operatorname{Re}(Y_n) \pm \operatorname{Im}(X_n) \times \operatorname{Im}(Y_n) \qquad (1)$$

where Re is an operator that returns the real part of a complex symbol, and Im is an operator that returns the imaginary part of a complex symbol.

Figure 1D:
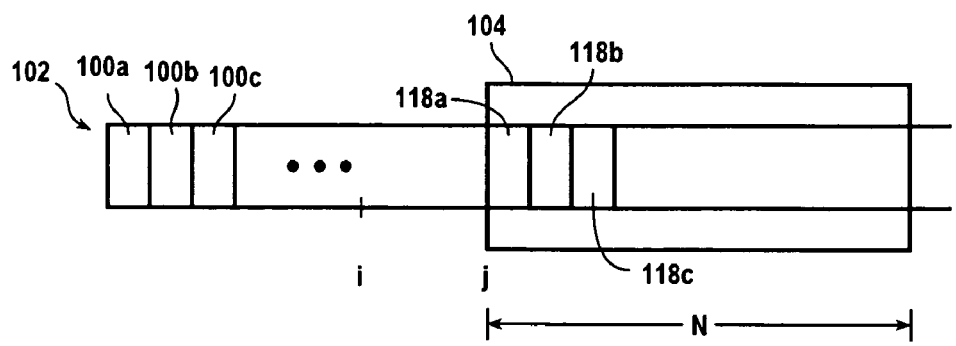
FIG. 1D illustrates the subsequent repositioning of the sliding window within the transmitted sequence.

The sliding window 104 is then successively repositioned, and, at each stage, the first values $X_n$ and the statistic $Z_i$ recomputed in the manner previously described, resulting in a set of values of the statistic $Z_i$ over a range of possible positions of the sliding window. FIG. 1D depicts the process of recomputing the first values and the statistic from the symbols 118a, 118b, 118c that occurs after the sliding window has been repositioned to position j. The second values $Y_n$ need not be recomputed at each stage as they are invariant to the relative position of the sliding window 104.

Figure 3A:
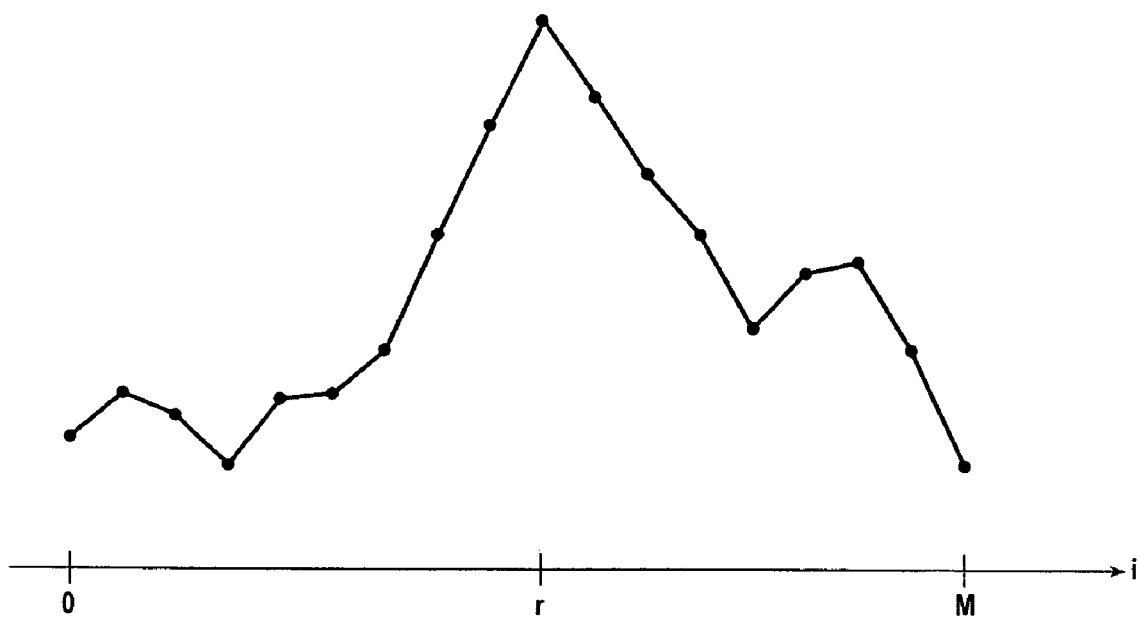
FIG. 3A illustrates a statistic that achieves a resonance condition at a local maxima and FIG. 3B illustrates a statistic that achieves a resonance condition at a local minima.
Figure 3B:
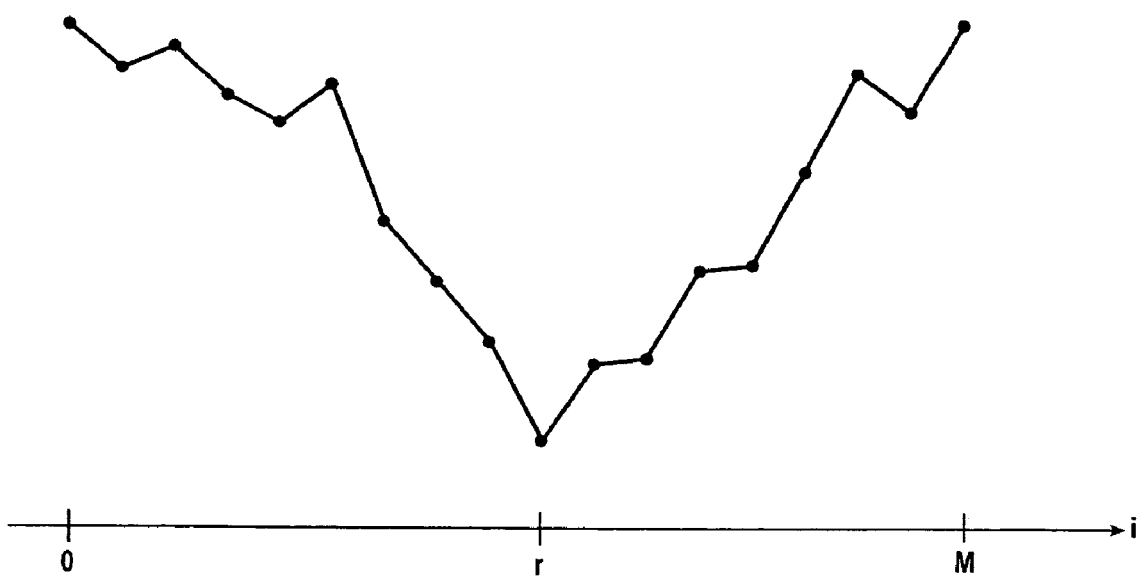

The statistic $Z_i$ is then plotted as a function of i, and the location r where the statistic resonates is identified. As shown in FIG. 3A, the location r may be a local maxima or, as shown in FIG. 3B, a local minima, depending on the specific form of the equation used to compute the statistic. This location, indicating the location of the sliding window where the aggregate of the phase differences represented by the first values are substantially equal to the aggregate of the phase differences represented by the second values, is determined to be the location of the known sequence within the transmitted sequence.

The foregoing represents one embodiment of the invention, and it should be appreciated that many alternative embodiments are possible. For example, in lieu of repositioning a sliding window within the transmitted sequence at each stage of the computation, the location of the sliding window may be fixed, and a different portion of the transmitted sequence shifted into the portion of the buffer encompassed by the sliding window at each stage of the computation.

As another example, many expressions for computing the statistic $Z_i$ are possible. In lieu of equation (1), for example, the following expression may be used:

$$\sum_{n=0}^{N-k-1} \operatorname{Re}(X_n) \times \operatorname{Im}(Y_n) \pm \operatorname{Im}(X_n) \times \operatorname{Re}(Y_n) \qquad (2)$$

Alternatively, the statistic may be computed as any of one of:

$$A_n^2 + B_n^2 \qquad (3)$$

$$|A_n| + |B_n| \qquad (4)$$

$$\max(|A_n|, |B_n|) \qquad (5)$$

where $$A_n = \sum_{n=0}^{N-k-1} \mathrm{Re}(X_n) \times \mathrm{Re}(Y_n) \pm \mathrm{Im}(X_n) \times \mathrm{Im}(Y_n) \quad (6)$$

$$B = \sum_{n=0}^{N-k-1} \mathrm{Re}(X_n) \times \mathrm{Im}(Y_n) \pm \mathrm{Im}(X_n) \times \mathrm{Re}(Y_n) \quad (7)$$

Figure 4:
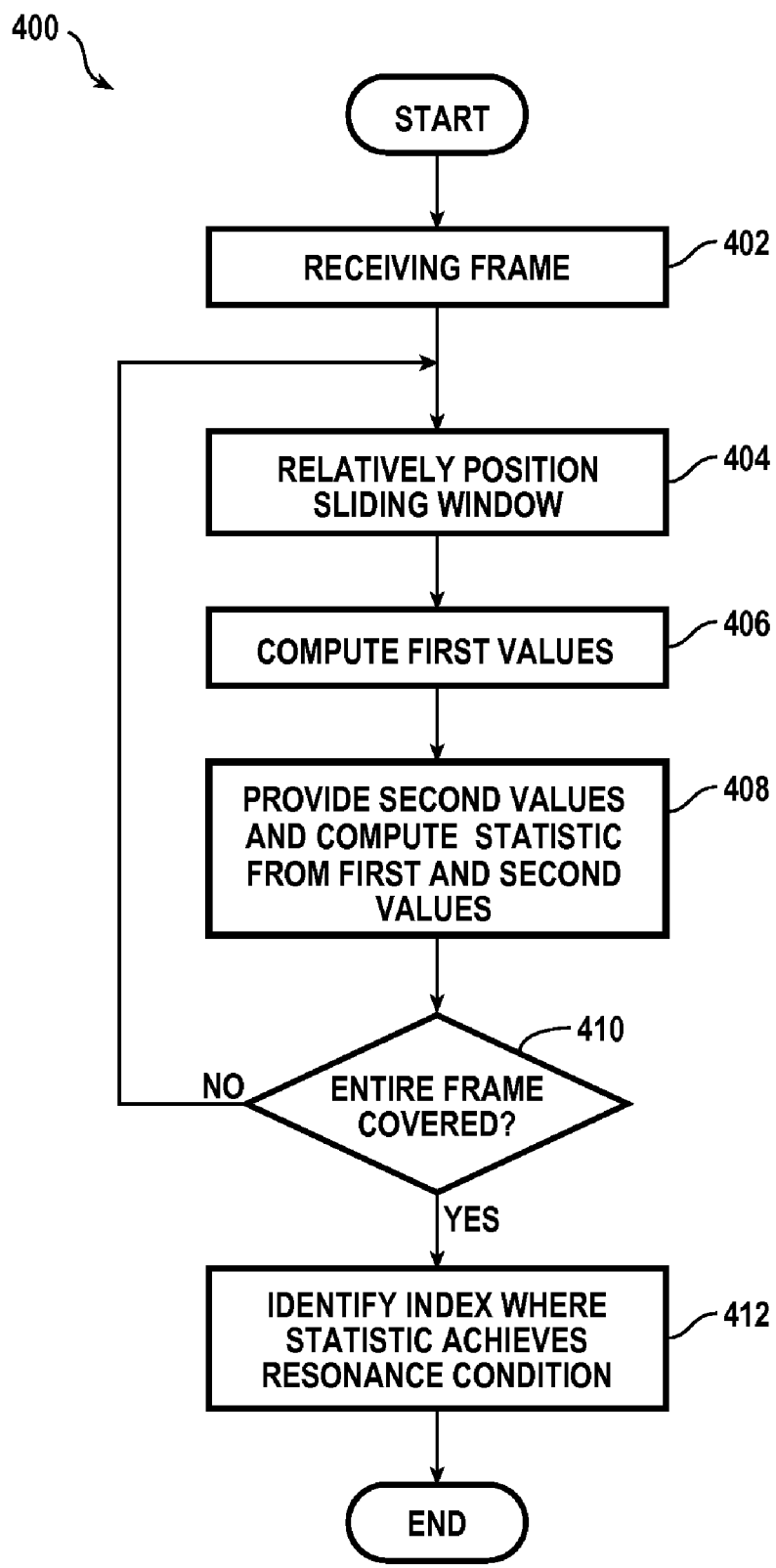
FIG. 4 is a flowchart showing a method of synchronizing frames performed by or within a receiver.

In one application, the foregoing method may be utilized by or within a receiver to synchronize frames. Referring to FIG. 4, a flowchart of one embodiment 400 of the foregoing method as applied to frame synchronization is illustrated.

Figure 5A:
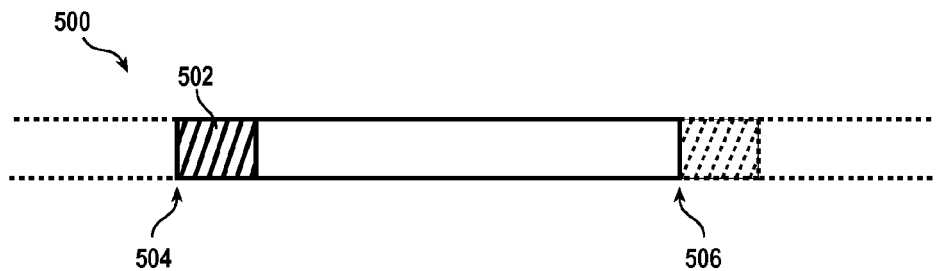
FIGS. 5A and 5B illustrate possible frame formats, as well as the undifferentiated data stream of concatenated frames typically received at the receiver.
Figure 5B:
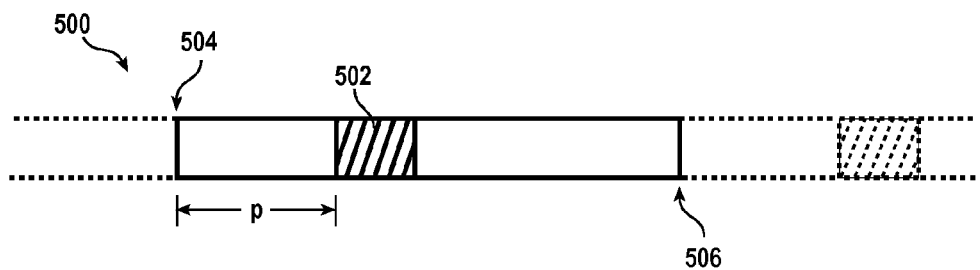

In step 402, a portion or more of a frame is received, the frame conforming to a format (assumed known to the receiver) calling for a sequence of N known symbols to be located within the frame at a known offset (which could be zero) from one of the frame ends. Thus, as shown in FIG. 5A, the known sequence 502 may be located at the beginning of frame 500 or, as shown in FIG. 5B, at a known offset of p symbols from the beginning of the frame. Although the frame format is assumed known to the receiver, as the frame is often part of an undifferentiated data stream, with other frames (shown in phantom in FIGS. 5A and 5B) having like format concatenated to the received frame, the frame ends are often not known to the receiver. The goal of the method is to first locate the known sequence 502 within a frame, and then, using the known format, locate the frame end 504, as well as subsequent frame ends 506 (using the total frame size that is also known to the receiver).

Returning to FIG. 4, in step 404, a sliding window of size N is relatively positioned such that the sliding window encompasses N symbols at position i within the frame.

In step 406, N–k first values $X_0, X_1, \ldots, X_{N-k-1}$ are successively formed from symbols within the sliding window as previously described, each representing an estimated difference in phase between first and second symbols within the sliding window that are offset from one another by k symbols, where k is an integer of one or more that is less than N, which offset may be known or unknown to the receiver.

In step 408, N–k–1 second values $Y_0, Y_1, \ldots, Y_{N-k-1}$ successively formed from symbols within the known sequence as previously described are provided, each representing an estimated difference in phase between first and second symbols within the known sequence that are offset from one another by k symbols, and each having a correspondence with one of the first values $X_0, X_1, \ldots, X_{N-k-}1$. A statistic $Z_i$ is formed from the first and second values in the manner previously described.

In step 410, a query is made whether the substantial entirety of the frame has been covered by the sliding window. For example, assuming M symbols within the frame, the method determines whether values of the statistic $Z_i$ have been obtained for values of the index i that substantially span the range of 0 to M. If not, the method jumps back to step 404 and performs another iteration after the sliding window has been relatively positioned to a new location. If so, the method proceeds to step 412.

In step 412, the value of index i where the statistic $Z_i$ achieves a resonance condition is identified. This location is determined to be the location of the known sequence within the frame. Using the known frame format, the method then identifies a frame end, and, using the known frame size, the ends of subsequent frames.

Figure 6:
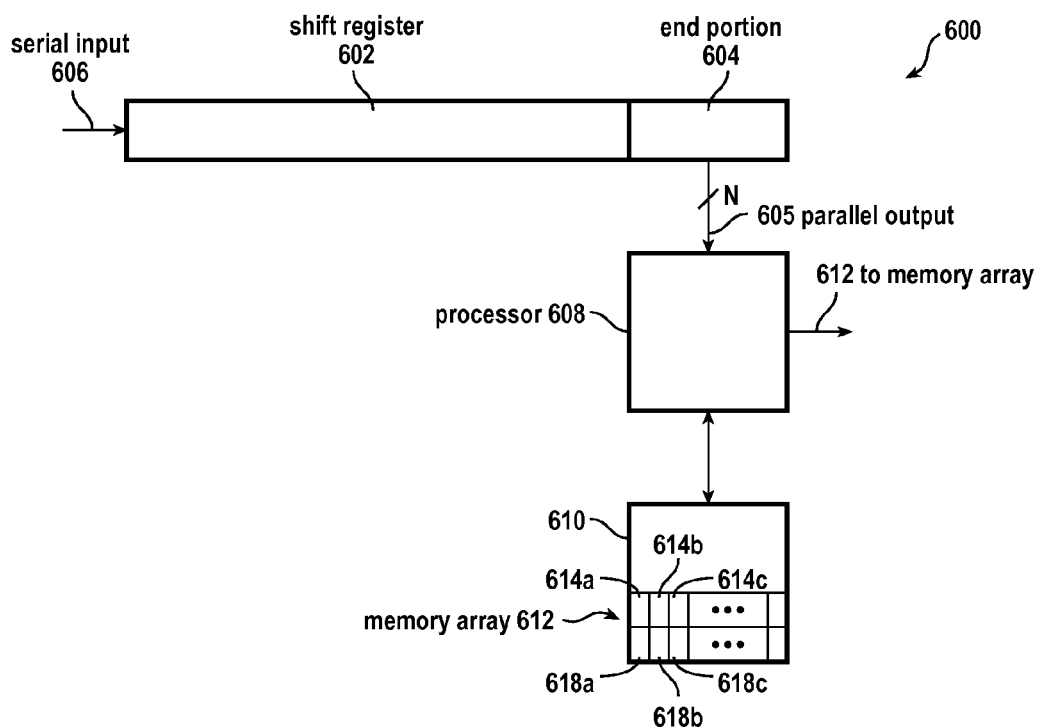
FIG. 6 is a block diagram of a system for locating a known sequence within a transmitted sequence.

FIG. 6 illustrates an embodiment 600 of a system, within or forming part of a receiver, for locating a known sequence of symbols within a transmitted sequence of symbols, the known sequence having a size of N symbols, wherein N is an integer of two or more.

The transmitted sequence is serially clocked into shift register 602 on a first-in-first-out basis through a serial input 606. The clocking of the shift register 602 is controlled by processor 608 through one or more control signals (not shown). An end portion 604 of shift register 602 having a length of N symbols forms a sliding window that is relatively positioned as the transmitted data serially progresses through the shift register 602. The relative position of the sliding window in relation to the transmitted sequence at a particular moment forms an index i.

A parallel output 605 of width N provides the N symbols within the end portion 604 to a processor 608 that is configured to compute the N–k–1 first values $X_0, X_1, \ldots, X_{N-k-}1$, from the N symbols within the end portion 604 in the manner previously described.

A memory 610 accessible by processor 608 holds the N–k second values $Y_0, Y_1, \ldots, Y_{N-k-1}$ previously computed by processor 608 from the known sequence in the manner previously described. During a previous initialization process, an array 612 of M locations 614a, 614b, 614c was reserved in the memory 610 for population by the computed values of the statistic $Z_i$.

A flag 618a, 618b, 618c maintained within memory 610 for each of these M locations indicates whether the corresponding location is populated or not. If set, the flag indicates the corresponding location has been populated. If reset, the flag indicates the corresponding location has not been populated. During the previously mentioned initialization process, each of these flags is reset.

During a particular stage of operation, the processor 608 calculates the statistic $Z_i$ as previously described and stores it at the specific location in the array corresponding to the value of the index i. To indicate that the memory location has been populated, the processor 608 also sets the associated flag.

The processor 608 then examines the flags 618a, 618b, 618c. If the flags indicate that any of the locations 614a, 614b, 614c remain unpopulated, the processor 608 directs the shift register 602 to shift the transmitted sequence until the sliding window represented by the end portion 604 is relatively positioned at a position corresponding to one of the unpopulated entries. With the sliding window relatively repositioned, the first values and the statistic are recomputed. The foregoing process is then repeated until all of the locations in the array have been populated.

The processor 608 then identifies the index r at which the statistic $Z_i$ achieves a resonance condition, and uses that to locate the known sequence within the transmitted sequence.

While various embodiments of the invention have been described, it will be apparent to those of ordinary skill in the art that many more embodiments and implementations are possible that are within the scope of this invention. For example, in lieu of the embodiment illustrated in FIG. 6, embodiments are possible where any of the described functionality may be performed by one or more logic devices, components, or modules, keeping in mind that, for purposes of this disclosure, the logic may be implemented as hardware, software, or a combination of hardware and software. Accordingly, the invention is not to be restricted except in light of the attached claims and their equivalents.

What is claimed is:

1. In a receiver, a method of locating a known sequence of symbols within a transmitted sequence of symbols comprising:

forming one or more first values from one or more symbols within a portion or more of the transmitted sequence, each of the one or more first values representing an estimated difference in phase between first and second symbols within the transmitted sequence that are offset from one another;

providing one or more second values formed from one or more symbols within the known sequence, each of the one or more second values representing an estimated difference in phase between first and second symbols within the known sequence that are offset from one another;

forming a statistic from the one or more first values and the one or more second values, wherein the statistic is computed as one of $A_n^2+B_n^2$, $|A_n|+|B_n|$, and $\max(|A_n|, |B_n|)$, where $$A_n = \sum_{n=0}^{N-k-1} \text{Re}(X_n) \times \text{Re}(Y_n) \pm \text{Im}(X_n) \times \text{Im}(Y_n),$$

$$B_n = \sum_{n=0}^{N-k-1} \text{Re}(X_n) \times \text{Im}(Y_n) \pm \text{Im}(X_n) \times \text{Re}(Y_n),$$

where $X_n$ is one of the one or more first values, Yn is one of the one or more second values, N is an integer of two or more, k is an integer of one or more that is less than N, Re is an operator that returns the real part of a complex symbol, and Im is an operator that returns the imaginary part of a complex symbol; and determining that the portion or more of the transmitted sequence is the known sequence if the one or more estimated differences in phase represented by the one or more first values are substantially equal to corresponding ones of the one or more estimated differences in phase represented by the one or more second values and identifying a frame end using the known sequence.

2. The method of claim 1 further comprising:

relatively positioning a sliding window of N or more symbols within the transmitted sequence, N comprising the number of symbols in the known sequence, the sliding window encompassing a portion or more of the transmitted sequence; and determining that the portion or more of the transmitted sequence within the sliding window is the known sequence if the one or more estimated differences in phase represented by the one or more first values are substantially equal to corresponding ones of the one or more estimated differences in phase represented by the one or more second values.

3. The method of claim 2 further comprising:

associating the statistic with the relative position of the sliding window within the transmitted sequence;

repeating the positioning and forming steps until the sliding window has substantially covered the portion or more of the transmitted sequence, resulting in a plurality of statistics, each associated with a distinct position within the portion or more of the transmitted sequence; and locating the known sequence within the portion or more of the transmitted sequence responsive to the plurality of statistics.

4. The method of claim 3, wherein each of the first values represents a difference in phase between first and second symbols within the sliding window that are offset from one another by k symbols.

5. The method of claim 4 wherein each of the second values represents a difference in phase between first and second symbols within the known sequence that are offset from one another by k symbols.

6. The method of claim 5 wherein a first value $X_n$, for each value of n in the set $0 \leq n \leq N-k-1$, is computed as $x_n \cdot x_{n+k}^*$, where $x_n$ is the nth symbol within the sliding window, and $x_{n+k}^*$ is the complex conjugate of the (n+k)th symbol within the sliding window.

7. The method of claim 6 wherein a second value $Y_n$, for each value of n in the set $0 \leq n \leq N-k-1$, is computed as $s_n \cdot s_{n+k}^*$, where $s_n$ is the nth symbol within the known sequence, and $s_{n+k}^*$ is the complex conjugate of the (n+k)th symbol within the known sequence.

8. The method of claim 3 wherein the known sequence is determined to be located at the position in the portion or more of the transmitted sequence where the statistic achieves a resonance condition.

9. The method of claim 3 wherein the known sequence is determined to be located at the position in the transmitted sequence where the statistic achieves a local maxima or minima.

10. In a receiver, a method of synchronizing frames comprising:

receiving a portion or more of a transmitted sequence comprising a sequence of N known symbols interleaved within a sequence of unknown symbols, where N is an integer of two or more;

relatively positioning a sliding window of size N or more symbols within the portion or more of the transmitted sequence, where the sliding window encompasses a portion or more of the transmitted sequence;

forming one or more first values from symbols within the sliding window, each of the one or more first values representing an estimated difference in phase between first and second symbols within the sliding window that are offset from one another;

providing one or more second values formed from symbols within the known sequence, each of the one or more second symbols representing an estimated difference in phase between first and second symbols within the known sequence that are offset from one another, the one or more estimated differences in phase represented by the one or more second values having a correspondence with the one or more estimated differences in phase represented by the one or more first values;

forming a statistic from the one or more first values and the one or more second values, wherein the statistic is computed as one of $A_n^2 B_n^2$, $|A_n|+|B_n|$, and $\max(|A_n|, |B_n|)$, where $$A_n = \sum_{n=0}^{N-k-1} \text{Re}(X_n) \times \text{Re}(Y_n) \pm \text{Im}(X_n) \times \text{Im}(Y_n),$$

$$B_n = \sum_{n=0}^{N-k-1} \text{Re}(X_n) \times \text{Im}(Y_n) \pm \text{Im}(X_n) \times \text{Re}(Y_n),$$

where $X_n$ is one of the one or more first values, Yn is one of the one or more second values, N is an integer of two or more, k is an integer of one or more that is less than N, Re is an operator that returns the real part of a complex symbol, and Im is an operator that returns the imaginary part of a complex symbol;

locating the known sequence within the portion or more of the transmitted sequence at the position of the sliding window if the one or more estimated differences in phase represented by the one or more first values are substantially equal to corresponding ones of the one or more estimated differences in phase represented by the one or more second values; and locating a frame end responsive to locating the known sequence in the portion or more of the transmitted sequence.

11. The method of claim 10 further comprising:
associating the statistic with the relative position of the sliding window within the portion or more of the transmitted sequence;
repeating the foregoing steps until the sliding window has substantially covered the portion or more of the transmitted sequence, resulting in a plurality of statistics, each associated with a distinct position within the transmitted sequence; and
locating the known sequence within the portion or more of the transmitted sequence responsive to the plurality of statistics.

12. The method of claim 10 wherein the known sequence is offset from the frame end by a offset, and the method further comprises locating the end of the frame responsive to the location of the known sequence and the offset.

13. In a receiver, a system for locating a known sequence of symbols within a transmitted sequence of symbols using logics, wherein the logics are implemented as hardware, the system comprising:
first logic for forming one or more first values from symbols within a portion or more of the transmitted sequence, each of the one or more first values representing an estimated difference in phase between first and second symbols within the transmitted sequence that are offset from one another;
second logic for providing one or more second values formed from symbols within the known sequence of N symbols, each of the one or more second values representing an estimated difference in phase between first and second symbols within the known sequence that are offset from one another;
third logic for determining that the portion or more of the transmitted sequence is the known sequence if the one or more estimated differences in phase represented by the one or more first values are substantially equal to corresponding ones of the one or more estimated differences in phase represented by the one or more second values and identifying a frame end using the known sequence; and
another logic for forming a statistic from the one or more first values and the one or more second values, wherein the statistic is computed as one of $A_n^2+B_n^2$, $|A_n|+|B_n|$, and $\max(|A_n|, |B_n|)$, where $$A_n = \sum_{n=0}^{N-k-1} \text{Re}(X_n) \times \text{Re}(Y_n) \pm \text{Im}(X_n) \times \text{Im}(Y_n),$$

$$B_n = \sum_{n=0}^{N-k-1} \text{Re}(X_n) \times \text{Im}(Y_n) \pm \text{Im}(X_n) \times \text{Re}(Y_n),$$

where $X_n$ is one of the one or more first values, $Y_n$ is one of the one or more second values, N is an integer of two or more, k is an integer of one or more that is less than N, Re is an operator that returns the real part of a complex symbol, and Im is an operator that returns the imaginary part of a complex symbol.

14. The system of claim 13 further comprising:
fourth logic for relatively positioning a sliding window of size N or more symbols within the transmitted sequence, N comprising the number of symbols in the known sequence, wherein the sliding window encompasses a portion or more of the transmitted sequence;
wherein the third logic is configured to determine that the portion or more of the transmitted sequence within the sliding window is the known sequence if the one or more estimated differences in phase represented by the one or more first values are substantially equal to corresponding ones of the one or more estimated differences in phase represented by the one or more second values.

15. The system of claim 14 further comprising fifth logic for (a) associating the statistic with the relative position of the sliding window within the portion or more of the transmitted sequence; (b) relatively repositioning the sliding window and reforming the one or more first values and the statistic until the sliding window has substantially covered the portion or more of the transmitted sequence, resulting in a plurality of statistics, each associated with a distinct position within the transmitted sequence; and (c) locating the known sequence within the portion or more of the transmitted sequence responsive to the plurality of statistics.

16. The system of claim 15 wherein each of the symbols in the transmitted sequence are complex, each of the first values represents a difference in phase between first and second symbols within the sliding window that are offset from one another by k symbols, and the first logic is configured to compute a first value $X_n$, for each value of n in the set $0 \leq n \leq N-k-1$, as $x_n \cdot x_{n+k}^*$, where $x_n$ is the nth symbol within the sliding window, and $x_{n+k}^*$ is the complex conjugate of the (n+k)th symbol within the sliding window.

17. The system of claim 16 wherein each of the symbols in the known sequence are complex, each of the second values represents a difference in phase between first and second symbols within the known sequence that are offset from one another by k symbols, and the second logic is configured to provide a second value $Y_n$, for each value of n in the set $0 \leq n \leq N-k-1$, computed as $s_{n+k}^*$, where $s_n$ is the nth symbol within the known sequence, and $s_{n+k}^*$ is the complex conjugate of the (n+k)th symbol within the known sequence.

18. The system of claim 15 wherein the fifth logic is configured to determine that the known sequence is located at the position within the transmitted sequence where the statistic achieves a local maxima or minima.

19. In a receiver, a system for locating a known sequence of symbols within a transmitted sequence of symbols comprising:
first means for forming one or more first values from symbols within a sliding window, each of the one or more first values representing an estimated difference in phase between first and second symbols within the sliding window that are offset from one another;
second means for providing one or more second values formed from symbols within the known sequence of N symbols, N being an integer of two or more, each of the one or more second values representing an estimated difference in phase between first and second symbols within the known sequence that are offset from one another;
third means for determining that the portion or more of the transmitted sequence is the known sequence if the one or more estimated differences in phase represented by the one or more first values are substantially equal to corresponding ones of the one or more estimated differences in phase represented by the one or more second values and identifying a flame end using the known sequence; and
fourth means for forming a statistic from the one or more first values and the one or more second values, wherein the statistic is computed as one of $A_n^2+B_n^2$, $|A_n|+|B_n|$, and $\max(|A_n|, |B_n|)$, where $$A_n = \sum_{n=0}^{N-k-1} \text{Re}(X_n) \times \text{Re}(Y_n) \pm \text{Im}(X_n) \times \text{Im}(Y_n),$$

$$B_n = \sum_{n=0}^{N-k-1} \text{Re}(X_n) \times \text{Im}(Y_n) \pm \text{Im}(X_n) \times \text{Re}(Y_n),$$

where $X_n$ is one of the one or more first values, Yn is one of the one or more second values, N is an integer of two or more, k is an integer of one or more that is less than N, Re is an operator that returns the real part of a complex symbol, and Im is an operator that returns the imaginary part of a complex symbol.

* * * * *